United States Patent
Ortmann et al.

(12)

(10) Patent No.: US 11,567,040 B2
(45) Date of Patent: Jan. 31, 2023

(54) INJECTOR WITH FLUID SUPPLY AND MOBILE PHASE DISCHARGE

(71) Applicant: Agilent Technologies, Inc., Santa Clara, CA (US)

(72) Inventors: Thomas Ortmann, Straubenhardt/Ottenhausen (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 1 day.

(21) Appl. No.: 16/760,429

(22) PCT Filed: Oct. 26, 2018

(86) PCT No.: PCT/IB2018/058383
§ 371 (c)(1),
(2) Date: Apr. 29, 2020

(87) PCT Pub. No.: WO2019/087027
PCT Pub. Date: May 9, 2019

(65) Prior Publication Data
US 2020/0340956 A1     Oct. 29, 2020

(30) Foreign Application Priority Data
Oct. 30, 2017   (DE) .......................... 102017125486.2

(51) Int. Cl.
*G01N 30/08*     (2006.01)
*G01N 30/20*     (2006.01)
(Continued)

(52) U.S. Cl.
CPC .............. *G01N 30/20* (2013.01); *G01N 30/08* (2013.01); *G01N 30/32* (2013.01); *G01N 30/36* (2013.01); *G01N 2030/201* (2013.01)

(58) Field of Classification Search
CPC ........ G01N 30/20; G01N 30/08; G01N 30/32; G01N 30/36; G01N 3030/201; G01N 2030/167; G01N 30/18; G01N 2030/326
(Continued)

(56) References Cited

U.S. PATENT DOCUMENTS

| 3,376,694 A | 4/1968 | Owens, II et al. |
| 3,916,692 A | 11/1975 | Abrahams et al. |

(Continued)

FOREIGN PATENT DOCUMENTS

| DE | 102014103766 A1 | 6/2014 |
| DE | 202016100451 U | 2/2016 |

(Continued)

*Primary Examiner* — Robert R Raevis

(57) ABSTRACT

Injector (40) for injecting a fluidic sample into a mobile phase in a sample separation apparatus (10), the injector (40) comprising a main flow path (100) between a fluid drive (20) and a sample separation device (30), wherein the fluid drive (20) is adapted to drive the mobile phase and the sample separation device (30) is adapted to separate the fluidic sample that is injected into the mobile phase, a discharge device (104) for discharging an, in particular predetermined, amount of the mobile phase from the main flow path (100), and a supply device (102) for supplying an, in particular predetermined, amount of the fluidic sample and/or of a solvent into the main flow path (100), wherein the discharged amount and the supplied amount compensate each other at least partially.

11 Claims, 6 Drawing Sheets

(51) Int. Cl.
*G01N 30/32* (2006.01)
*G01N 30/36* (2006.01)

(58) Field of Classification Search
USPC ......... 73/23.41, 23.24, 23.42, 64.56, 863.21,
73/864.21, 864.33, 864.81, 864.83,
73/864.85; 422/70, 88, 89
See application file for complete search history.

(56) References Cited

U.S. PATENT DOCUMENTS

| | | |
|---|---|---|
| 4,939,943 A | 7/1990 | Strohmeier |
| 5,938,817 A | 8/1999 | Shibamoto et al. |
| 6,893,569 B2 | 5/2005 | Zelechonok |
| 2004/0251203 A1 | 12/2004 | Zelechonok |
| 2009/0145205 A1 | 6/2009 | Hochgraeber et al. |
| 2013/0139568 A1 | 6/2013 | Guieze et al. |
| 2015/0226710 A1 | 8/2015 | Hochgraeber et al. |
| 2015/0316516 A1 | 11/2015 | Albrecht, Jr. et al. |

FOREIGN PATENT DOCUMENTS

| | | | |
|---|---|---|---|
| EP | 0309596 A1 | | 4/1989 |
| EP | 2 402 746 | * | 1/2012 |
| JP | H04254756 | * | 9/1992 |
| JP | 10213575 | * | 8/1998 |
| JP | H10213575 | * | 8/1998 |
| WO | 2012175111 A1 | | 12/2012 |

* cited by examiner

INJECTOR WITH FLUID SUPPLY AND MOBILE PHASE DISCHARGE

RELATED APPLICATIONS

This application is the national stage under 35 U.S.C. 371 of International Application No. PCT/IB2018/058383, filed Oct. 26, 2018, which claims priority to German Application No. DE 10 2017 125 486.2, filed Oct. 30, 2017, the entire contents of both of which are incorporated by reference herein.

TECHNICAL BACKGROUND

The present invention relates to an injector for injecting a fluidic sample into a mobile phase in a main flow path of a sample separation apparatus, a sample separation apparatus, and a process.

In a high-performance liquid chromatography (HPLC) system, a liquid (mobile phase) is typically moved with a very precisely controlled flow rate (for example in the range of microliters to milliliters per minute) and at a high pressure (typically 20 to 1000 bar and beyond, currently up to 2000 bar), at which the compressibility of the liquid is noticeable, in order to separate from each other individual components of a sample liquid that has been introduced into the mobile phase. Such an HPLC system is known, for example, from EP 0.309.596 B1 of the same applicant, Agilent Technologies, Inc.

For liquid chromatography, it is necessary to lead in a fluidic sample to be investigated into the system. Such systems for leading in (also known as injecting or introducing) a fluidic sample are known from U.S. Pat. Nos. 4,939,943, 3,916,692, 3,376,694 and 6,893,569.

In contrast to conventional injectors, in a principle known as "Feed Injection", a flow path between a fluid drive and a sample separation device is continuously operated without interruption if a fluidic sample is introduced for example at a fluidic T-point. Examples of injectors according to the "Feed Injection" principle are described in US 2015/0316516 A1 and US 2015/0226710 A1.

However, the process of introducing the fluidic sample into the flow path between the fluid drive and the sample separation device according to the "Feed Injection" principle can lead to artifacts, for example fluctuations or jumps in pressure and flow rate. This can undesirably have an effect on the chromatographic separation result.

SUMMARY

It is an object to provide an injector for a sample separation apparatus which enables a sample separation essentially free of pressure and/or flow fluctuations that are caused by a sample injection.

According to an exemplary embodiment example of the present invention, there is established an injector (which can also be referred to as a sample supply device) for injecting a fluidic sample into a mobile phase in a sample separation apparatus (for example a chromatographic sample separation apparatus), wherein the injector has a main flow path between a fluid drive (for example a high pressure pump) and a sample separation device (for example a chromatographic separation device), wherein the fluid drive is adapted to drive the mobile phase and the sample separation device is adapted to separate the fluidic sample that has been injected into the mobile phase, a discharge device (that is in particular embodied in addition to and/or separate from the main flow path) for discharging a (in particular predetermined) amount (or quantity) of the mobile phase from the main flow path (and in particular into a discharge flow path, which can also be generally referred to as a discharge path), and a supply device (that is in particular embodied in addition to and/or separate from the main flow path) for supplying a (in particular predetermined) amount (or quantity) of the fluidic sample and/or of a solvent (in particular from a supply flow path, which can also be generally referred to as a supply path) into the main flow path, wherein the discharged amount and the supplied amount (are preferably substantially simultaneously supplied and/or discharged and) compensate each other at least partially.

According to this embodiment example, the discharge device may be located at least partially in a discharge flow path, which may be fluidically coupled to the main flow path via at least one discharge coupling point (or also called branch point), but may otherwise extend externally to the main flow path. Correspondingly, the supply device may also be located at least partially in a supply flow path, which may be fluidically coupled to the main flow path via at least one supply coupling point (or also called combination point), but may otherwise extend externally to the main flow path. Preferably, the at least one discharge coupling point may be located—within the main flow path—upstream of the at least one supply coupling point. The discharge flow path and the supply flow path may optionally be fluidically coupled to each other, preferably at ends that are opposite to the discharge coupling point and/or the supply coupling point. The discharge flow path and the supply flow path may be operatively coupled to each other, in particular in such a way that the fluid flows in the discharge flow path and the supply flow path correspond to each other, preferably in time and/or in magnitude, thus, for example, that a flow rate in the discharge flow path corresponds to a flow rate in the supply flow path in time and/or in magnitude, and/or in absolute value, and preferably are equal. Preferably, the coupling between the discharge flow path and the supply flow path can be designed such that there is no (fluidic) flow-through between the discharge flow path and the supply flow path, i.e. that no fluid is transferred from the discharge flow path to the supply flow path.

According to another exemplary embodiment example, there is provided a sample separation apparatus for separating a fluidic sample, wherein the said sample separation apparatus has a fluid drive for driving a mobile phase, a sample separation device for separating the fluidic sample in the mobile phase, and an injector having the above-described features for injecting the fluidic sample into the mobile phase.

According to yet another exemplary embodiment example, there is provided a method, wherein in the method, a mobile phase is driven in a main flow path of a sample separation apparatus between a fluid drive and a sample separation device, a (particularly predetermined) amount (or quantity) of the mobile phase is discharged from the main flow path (in particular at a discharge flow path that branches off from the main flow path at a fluidic branch point and is embodied separately from the main flow path), and a (in particular predetermined) quantity of a fluidic sample and/or of a solvent is supplied to the main flow path (in particular at a supply flow path that opens into the main flow path at a fluidic combination point and is embodied separately from the main flow path), wherein the discharged amount and the supplied amount are dimensioned such that they compensate each other at least partially.

In the context of the present application, the term "fluidic sample" is understood in particular to refer to a medium that contains gas and/or a liquid as well as the matter actually to be analysed analyzed (for example, a biological sample, such as for example a protein solution, a pharmaceutical sample, etc.).

In the context of the present applications, the term "mobile phase" is understood in particular to refer to a fluid (in particular a gas and/or a liquid), which serves as a carrier medium for transporting the fluidic sample from the fluid drive to the sample separation device. For example, the mobile phase may be a (for example, organic and/or inorganic) solvent or a solvent composition (for example, water and ethanol).

In the context of the present applications, the term "solvent" is understood in particular to refer to a (for example, organic and/or inorganic) fluid (further in particular a gas and/or a liquid), which is used in the context of the separation analysis. For example, the solvent may be a diluting agent for the fluidic sample or a rinsing solution. The solvent can also be embodied as a solvent composition (for example, water and ethanol).

In the context of the present application, the term "main flow path" (which may also be referred to very generally as a flow path) may be understood to refer in particular to a fluidic path for transporting a fluid from the fluid drive (in particular a high-pressure pump) to the sample separation device (in particular a chromatography separation column). Preferably, other fluidic paths of the injector or the sample separation apparatus do not belong to the main flow path. In particular, those fluidic paths of the injector or of the sample separation apparatus, which branch off from the main flow path and/or which lead into the main flow path, may not belong to the main flow path. In particular, a discharge flow path, which branches off from the main flow path, and in which at least part of a discharge device that is separate from the main flow path may be implemented, may be designed as a fluidic path that is separate from the main flow path and different from the main flow path. Alternatively or additionally, a supply flow path, which leads into the main flow path, and in which at least part of a supply device that is separate from the main flow path may be implemented, may be designed as a fluidic path that is separate from the main flow path and different from the main flow path.

In the context of the present applications, the term "compensate at least partially" is understood in particular to refer to that the discharged amount reduces the supplied amount and/or the total amount or filling amount in whole or in part, so that in the end no additional fluid amount at all (in the sense of complete compensation) or an additional fluid quantity that is reduced in comparison with the supplied amount flows in the direction of the sample separation device. The mentioned compensation can also be effected such that the discharged amount even exceeds the supplied amount.

According to an exemplary embodiment example of the invention, for example, upon the injection of a fluidic sample into a separation path between a fluid drive and a sample separation device, a fluidic sample (or a solvent) that is intended for separation may be introduced, and mobile phase may be discharged from the main flow path reducing artifacts resulting from the changed flow in the main flow path. A strong change of the flow rate or of the pressure and/or the formation of other artifacts (such as, for example, fluidic oscillations or fluctuation phenomena or pressure surges), which may conventionally occur upon injection of a fluidic sample, for example according to the "Feed Injection" principle, may be strongly suppressed or completely eliminated by the complete or at least partial compensating of the amount of fluid that is coupled-in into the main flow path during injection by the discharging of mobile phase. Demonstratively, during the sample injection, a flow towards the sample separation device can be kept substantially constant and thus a pressure (especially at the sample separation device) can be kept essentially constant. Thus, the flow is only marginally disturbed when injecting the sample. By the suppression of artifacts resulting from the injection process, an interference-free sample separation can be ensured.

Further embodiment examples of the injector, the sample separation apparatus and the method are described below.

According to an embodiment example, the main flow path (in particular a high-pressure path) may contain neither the discharge device nor the supply device. In particular, a fluidic discharge flow path may be provided which leads away from the main flow path (for example at a fluidic branch point). Alternatively or in addition, a fluidic supply flow path may be provided, which may lead into the main flow path (for example at a fluidic combination point). The latter may be effected in particular while the flow in the main flow path (in particular under high pressure) remains maintained. Furthermore, the discharge flow path and the supply flow path may not be identical in relation to the main flow path with the latter and also may not form a part of the main flow path, but may be separate or independent thereof (but preferably fluidically coupled to the main flow path continuously or temporarily). However, the main flow path, the supply flow path and the discharge flow path may be controlled jointly and synchronized to each other.

According to an embodiment example, there is effected no flow-through of fluid (in particular a liquid) through the discharge flow path and through the supply flow path. Instead, fluid that is discharged from the discharge flow path is not introduced into the supply flow path. The fluids that are flowing in the supply flow path and in the discharge flow path may therefore be different from each other.

According to an embodiment example, a predetermined or defined amount of the fluidic sample may be fed into the main flow path. Thus, a particularly precise compensation of the added fluid by the removed fluid is possible. For example, it is possible to supply fluidic sample continuously and thus without interruption until fluidic sample in a corresponding sample reservoir (for example a sample receiving volume, for example a so-called "sample loop") is used up. It is also possible, however, to introduce a defined sample volume into the main flow path with one or plural interruptions in a discontinuous process, for example defined by a path covered by a piston of a piston pump in a piston chamber.

According to an embodiment example, the respective amount can be a volume. In other words, the at least partial compensation can be effected by a partial or complete compensation of a volume of supplied fluid sample or solvent by a volume of discharged solvent or mobile phase. Alternatively, on the basis of an added mass of the sample and/or of the solvent, the added amount of fluid can be compensated in whole or in part by discharging a corresponding mass of the mobile phase.

According to an embodiment example, the supply device and the discharge device can be configured such that the supplied amount (in particular a supplied fluid volume) and the discharged amount (in particular a discharged fluid volume) differ from one each other by less than 30 percent by volume, in particular by less than 10 percent by volume.

Corresponding small discrepancies between the amounts of supplied and discharged fluids can be absorbed by the sample separation apparatus without a significant deterioration in the freedom from interference of the measurement or without the occurrence of pronounced artifacts. Furthermore, an admissible discrepancy can be related to the system flow, for example such that the discrepancy divided by the injection time (which gives the deviation of the total flow rate) is less than 30%, in particular less than 10%, of the system flow rate.

According to a embodiment example, the supply device and the discharge device can be configured such that the supplied amount (in particular a supplied fluid volume) and the discharged amount (in particular a discharged fluid volume) are substantially equal. Thus the diverted quantity can at least substantially correspond to the supplied amount. It is preferred if the supplied fluid and the discharged fluid are completely identical in respect of amount (and particularly preferred also in respect of flow rate, whereby alternatively modifications in the flow rate are also possible). In the case of a substantially complete or exact compensation of the amounts of supplied fluid and discharged fluid, a particularly failure-robust operation of the sample separation apparatus is possible.

According to an embodiment example, a flow rate of the discharged mobile phase can correspond to a flow rate of the supplied fluidic sample and/or solvent. In this context, a flow rate is understood in particular to refer to the volume of a flowing fluid per unit time. Preferably, the supply device and the discharge device can be arranged to perform the supply of the fluidic sample and/or of the solvent and the discharge of the mobile phase such that the total flow rate in the main flow path outside of the section between the supply device and the discharge device remains unchanged or substantially unchanged. In other words, the supply device and the discharge device can be advantageously arranged to perform the supply of the fluid sample and/or of the solvent and the discharge of the mobile phase such that a flow rate downstream of the supply device and a flow rate upstream of the discharge device correspond to each other, in particular are substantially equal. In the case of a substantially complete flow rate compensation, the artifacts can be suppressed or eliminated particularly well.

According to an embodiment example, the supply device and the discharge device can be configured to carry out the supply of the fluidic sample and/or of the solvent and the discharge of the mobile phase synchronously, i.e. in a manner that is coordinated with each other in respect of the temporal course of the supplying and discharging. For example, a common control device may control a well-defined temporal and thus also functional relationship between the supplying of the fluidic sample and/or of a solvent on the one hand and the discharging of a mobile phase on the other hand. In this way, the temporal relationship between the supplied fluid and the discharged fluid can be coordinated in such a way that fluidic artifacts such as pressure fluctuations or pressure surges can be suppressed particularly effectively. Also, a mechanical coupling of conveying or receiving devices (or pumps) for supplying and discharging the respective fluid can support such a synchronization, for example by applying to the pistons a fixed phase relationship as a result of the mechanical coupling.

According to an embodiment example, the supply device and the discharge device can be configured to perform the supplying of the fluidic sample and/or of the solvent and the discharging of the mobile phase simultaneously, i.e. at the same time. A particularly good freedom from interference, suppression of artifacts and/or performance can be obtained, if a time interval of the supplying of the fluidic sample and/or of the solvent into the main flow path on the one hand and a time interval of the discharging of the mobile phase from the main flow path on the other hand are identical or at least overlap in time.

According to an embodiment example, the injector can have a fluidic combination point in the main flow path, at which the supplied fluidic sample and/or solvent on the one hand and the mobile phase driven by the fluid drive (and not previously discharged) on the other hand are combined (or joined together) as fluidic flows upon supplying. At such a fluidic combination point, the partial flows of the mobile phase conveyed between the fluid drive and the sample separating device on the one hand and the fluidic sample injected into the main flow path or the solvent injected into the main flow path on the other hand can combine to a common flow, which is conveyed by the fluid drive to the sample separating device. Such a fluidic combination point can be designed, for example, as a fluidic T-piece, fluidic Y-piece or fluidic X-piece.

According to an embodiment example, the injector can have a fluidic branch point in the main flow path, at which mobile phase driven by the fluid drive is discharged from the main flow path at least partially. In particular, at the branch point, the mobile phase can be guided in part in the direction of the sample separation device and can be removed in another part from the main flow path. Such a fluidic branch point can be designed, for example, as a fluidic T-piece, fluidic Y-piece or fluidic X-piece. A branch point can also be located outside the injector.

According to an embodiment example, the fluidic branch point can be located upstream of the fluidic combination point. The mobile phase that is conveyed to the sample separating device by the fluid drive flows firstly to the fluidic branch point, where it can split into two partial flows. One of the partial flows can then continue flowing to the fluidic combination point. In particular, the fluidic branch point and the fluidic combination point can be arranged relative to each other such that fluid does not pass the branch point after passing through the combination point.

According to an embodiment example, the main flow path can be fluidically coupled or is coupled between the fluid drive and the sample separation device such that a flow between the fluid drive and the sample separation device remains maintained without interruption during operation of the sample separation device. With advantage, an interruption of the flow upon injection of the fluidic sample and/or of the solvent and/or upon partially coupling out mobile phase from the main flow path at an injector according to the described embodiment example of the invention can be avoided by the flow of mobile phase between the fluid drive and the sample separation device continuing to run during injection. This measure further reduces the causes that can conventionally lead to the formation of fluidic artifacts during operation of the sample separation apparatus.

According to an embodiment example, the discharge device can be designed purely passively with a restrictor (i.e. a fluidic resistance) that can in particular be switched on. The latter may, with advantage, be configured such that a supplied flow is substantially the same as a passively discharged flow. In such a configuration, the discharge device is not actively controlled by a pump or the like, but can be activated solely by coupling a fluidic restrictor to the main flow path. The magnitude of the fluidic resistance of the restrictor then determines which portion of the mobile phase is discharged from the main flow path.

According to an embodiment example, the injector can have at least one pump, in particular a piston pump, the piston or pistons of which is or are movable for supplying the fluidic sample and/or the solvent and/or for discharging the mobile phase. In the context of the present application, a "piston pump" is understood in particular to refer to a fluid drive which has at least one piston which reciprocates in at least one associated piston chamber and which delivers fluid during reciprocation. By one or plural piston pumps, the supplied fluid quantity and the discharged fluid quantity can be matched to each other with little effort and at the same time with high precision.

However, as an alternative to implementing at least one piston pump, it is possible to provide one or preferably at least two pumping devices (e.g. peristaltic pumps), which are not designed as piston pumps. For example, such pumping devices can also be synchronized electrically and thus accomplish the described supplying or discharging. Thus, pumps other than piston pumps are also possible to drive the fluids (for example peristaltic pumps). In the following (see in particular the following four paragraphs), additional embodiments are described using the example of piston pumps, whereby a specialist will understand that for all the following embodiment examples, instead of one, two or more piston pumps, one, two or more pumps of a different type can also be used.

According to an embodiment example, a common piston pump can be provided for supplying the fluidic sample and/or the solvent and for discharging the mobile phase and can be configured such that the supplying of the fluidic sample and/or of the solvent and the discharging of the mobile phase can be effected simultaneously in a push-pull operation. Such an embodiment example is shown in FIG. 3. For example, a piston pump having two variable fluid intake volumes can then be operated such that a piston displacement changes the two variable fluid intake volumes as a function of an actual piston position. The fluidic sample or solvent can then be accommodated in one fluid intake volume, whereas the mobile phase can be accommodated in the other fluid intake volume. Each piston displacement then increases one fluid intake volume at the expense of the other, and vice versa. In this way, a particularly compact and simple injector can be established.

According to another embodiment example, the injector may have a first piston pump for supplying the fluid sample and/or the solvent, and a second piston pump for discharging the mobile phase. An injector can be operated particularly precisely and variably, in which two synchronized piston pumps are provided, one of which effects the discharging of the mobile phase and the other the supplying of the fluid sample and/or the solvent. With such an embodiment, a particularly strong increase in the freedom from interference of separation results is possible.

According to an embodiment example, the first piston pump and the second piston pump can be operatively coupled with each other, in particular synchronized with each other. This can be achieved, for example, by means of an eccentric disc which can be coupled on the drive side with the pistons of the two piston pumps that are capable to reciprocate such that the, for example cyclical, piston strokes of the two piston pumps, can be precisely correlated. In other words, the two piston pumps can then be operated with a firmly defined phase relationship.

According to an embodiment example, the at least one piston pump can be designed to operate without interruption over an arbitrary number of piston cycles. In this way, a continuous operation of the injector is possible, whereby inactive time periods of the injector can be avoided. In other words, a continuously running pump can be provided in the circulation path. An associated sample separation apparatus can therefore be operated particularly effectively.

According to an embodiment example, the supply device may have a fluid valve, which is switchable for supplying the fluid sample from a sample source and/or for supplying the solvent into the main flow path. For example, such a fluid valve may have a rotor component and a stator component, which may be rotatable relative to each other, and which may have corresponding fluidic structures. For example, fluidic channels (for example in the form of grooves), which can be fluidically coupled to fluidic connections (for example called ports) of the stator component or decoupled therefrom, may be formed in the rotor component in order to set different fluidic coupling states according to different valve states.

According to an embodiment example, the injector may have only one single fluid valve (see, for example, FIG. 7). In other words, the injector may be equipped with a single fluid valve. In this way, the injector and the associated sample separation apparatus can be formed particularly compact.

According to an embodiment example, the injector may have a sample receiving volume that is fluidically coupled to the fluid valve (which can also be referred to as a "sample loop"), wherein the fluid valve is switchable such that after the fluidic sample has been received from the sample source in the sample receiving volume, the fluidic sample that is received in the sample receiving volume can be supplied to the main flow path by switching the fluid valve. In this way, the amount of fluidic sample to be supplied can be adjusted very precisely (for example, in correspondence to the size of the sample receiving volume).

According to an embodiment example, the injector may have a pre-compression device, which is designed to pre-compress the fluidic sample and/or the solvent before supplying it into the main flow path. Undesirable pressure surges when switching a fluid valve can thus advantageously be avoided or at least strongly suppressed. If the pressure of the fluidic sample is approximated to, or is even brought exactly to this pressure in the main flow path before the fluidic sample is supplied into the main flow path, undesirable pressure surges, which impair the freedom from interference when supplying the fluidic sample or the solvent into the main flow path, may be reduced or completely avoided.

According to an embodiment example, the pre-compression device may be configured to pre-compress said sample receiving volume to the main flow path before switching in. Then, the fluidic sample or the solvent can firstly be applied to the sample receiving volume or the sample loop, subsequently the pressure of the sample receiving volume can be increased and thus be brought into the range of the pressure in the main flow path, and finally the fluidic sample or the solvent can be introduced into the main flow path in a pre-compressed state and thus without a pronounced pressure surge. In addition, the service life of the sample separation apparatus or other system elements can then be increased, because damaging pressure surges are reduced or completely avoided.

According to an embodiment example, the pre-compression device can have a piston pump, which is operable to pre-compress and supply the fluidic sample and/or the solvent into the main flow path. Demonstratively, by shifting the piston of the piston pump, the pressure of the fluidic sample and/or of the solvent can be increased such that the pressure difference between the original pressure of the fluidic sample and/or of the solvent on the one hand and the main flow path on the other hand is reduced advantageously. In a different operating state of the injector, the same piston pump can be used to convey the fluidic sample and/or the solvent.

According to an embodiment example, the fluid valve can be designed to form or to integrate in its interior at least a part of the main flow path, the supply device and/or the discharge device. The integration of one or more of these components into the fluid valve of the injector allows a particularly compact configuration as well as short fluidic paths and therefore low dead volumes and a reduction or a complete elimination of the non-purged sections of the main flow path.

According to a embodiment example, the mobile phase that is discharged by the discharge device (in particular a mobile phase resulting from one of the earlier injection processes or from the current injection process) can be used at least partially as the solvent that is supplied by the supply device. The quantity of operating fluids that is required for the operation of the injector and/or of the sample separation device as well as the quantity of liquid waste can be reduced in this way.

According to an embodiment example, the discharge device can be coupled downstream of the supply device, in particular such that a complete mixing of the flow of the mobile phase with the supplied flow of the solvent and/or of the fluidic sample can be effected before a mixed flow reaches a branch point. This can be used in particular in combination with an at least partial reuse of the discharged mobile phase (or fluid) for a controlled dilution of the sample. Furthermore, this design may be advantageous in a process analysis or in a two-dimensional liquid chromatography (2D-LC) apparatus, in particular in a tandem LC apparatus, as described in the application WO 2012/175111 A1 of the same applicant. Thereby, for example, a sample can be lead representatively to the separating device without the separating device being overloaded or coming into contact with a sample matrix that is not (or not sufficiently) diluted. The fact that a proportional part of the sample is discarded during injection is usually acceptable or even advantageous in applications of this type.

According to an embodiment example, the sample separation apparatus can be a preparative sample separation apparatus. In a preparative sample separation apparatus (for example, a preparative HPLC), large volumes of fluid are moved (for example, up to 500 ml in a sample analysis), and the flow rate can be up to 20 ml/min and more, for example. Also, the sample volumes can range from several milliliters to several hundred milliliters and beyond. Alternatively, a sample separation apparatus according to an exemplary embodiment example can also be designed as an analytical sample separation device, which is operated with considerably lower fluid volumes and flow rates.

The sample separation apparatus can be a microfluidic measuring apparatus, a life science apparatus, a liquid chromatography apparatus, an HPLC (High Performance Liquid Chromatography) apparatus, a UHPLC (Ultra-High Performance Liquid Chromatography) system, an SFC (supercritical liquid chromatography) apparatus, a gas chromatography apparatus, an electrochromatography apparatus and/or a gel electrophoresis apparatus. However, many other applications are possible.

The fluid drive and/or fluid pump may, for example, be designed to move the mobile phase through the system at a high pressure, for example from a few 100 bar up to 1000 bar or more.

The sample separation apparatus may have a sample injector and/or a sample introduction unit for introducing the sample into the fluidic separation path. Such a sample injector may have an injection needle, which can be coupled to a seat, in a corresponding fluidic path, wherein the needle can be withdrawn from this seat to receive sample. After reinsertion of the needle into the seat, the sample can be further processed.

The sample separation apparatus may include a fraction collector for collecting the separated components. Such a fraction collector may lead the different components, for example, into different liquid containers. The analyzed sample may also be supplied to a drain container.

Preferably, the sample separation apparatus may have a detector for detecting the separated components. Such a detector may produce a signal which can be observed and/or recorded, and which is indicative for the presence and the amount of the sample components in the fluid flowing through the system.

BRIEF DESCRIPTION OF THE DRAWINGS

Other objectives and many of the accompanying advantages of embodiment examples of the present invention will become easily perceptible and better understood with reference to the following more detailed description of implementation examples in connection with the attached drawings. Features which are essentially or functionally identical or similar will be provided with the same reference numerals.

Figure 1:
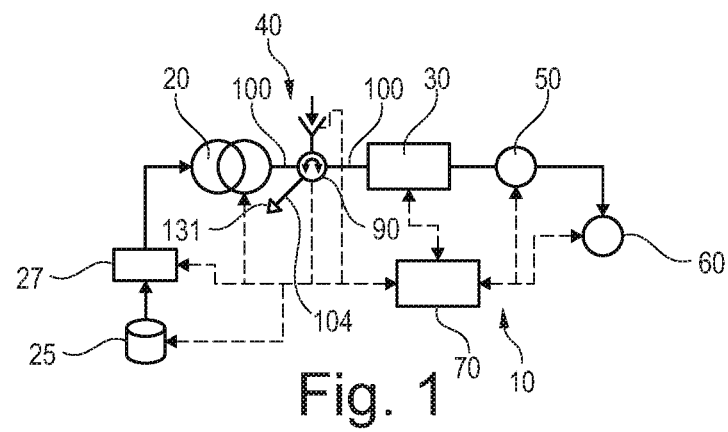
FIG. 1 shows a sample separation apparatus that is formed as an HPLC measuring apparatus according to an exemplary embodiment of the invention.

The illustration in the drawing is schematic.

DETAILED DESCRIPTION

Before exemplary embodiment examples of the invention are described in more detail with reference to the figures, some basic considerations of the present invention shall be described in general terms, on the basis of which exemplary embodiment examples of the invention have been developed.

According to an exemplary embodiment example, an injector for a sample separation apparatus is established, which can be operated (preferably, but not necessarily, according to the "Feed Injection" principle) in order to remove mobile phase from the system when a fluidic sample and/or a solvent is introduced into a main flow path to increase the freedom from interference of a separation result. This can counteract an excessive increase in the flow when fluidic sample and/or solvent is introduced. In this manner, it is in particular possible to introduce a fluidic sample into a main flow path without significantly disturbing the fluidic flow in the main flow path outside the injector (wherein the injector may include the combination point and the branch point). This advantageously suppresses unwanted flow and/or pressure fluctuations and pressure surges.

According to an exemplary embodiment example, it is possible to inject fluidic sample into the separation path without reducing, stopping, assigning another value to, or otherwise manipulating a flow rate that is provided by a fluid drive to drive mobile phase. In particular, this makes it possible to not disturb the continuous operation of the fluid drive, to not influence a programmed gradient shape, to be able to dispense with a control coupling with the fluid drive and/or to gain other advantages. To achieve this, for example, a corresponding part of the mobile phase can be discharged from the main flow path simultaneously or synchronously with the injection of the fluidic sample and/or of a solvent into the main flow path. In doing so, the discharged amount (or quantity) of fluid (in particular the discharged volume of fluid) can be chosen to be substantially equal to the amount (or quantity) of supplied fluidic sample, whereby disturbances and/or transition phenomena of the total flow or pressure can be eliminated. For example, the discharge flow rate can be set substantially equal to the injection flow rate. In this case, the discharge flow rate and/or the discharge volume may correspond to the discharged volume of the compressed fluid (especially a liquid).

According to an embodiment example, the discharged mobile phase may be reintroduced into the main flow path at another point in time and/or at another position, wherein the flow rate of the fluid drive may then be readjusted. It is also possible to return the discharged mobile phase to a mobile phase source container or to a waste path. It is also possible to at least partially recover the energy of the discharge flow to drive the injection flow.

The discharge position for discharging the mobile phase (in particular a solvent or a solvent composition) may be located upstream or downstream of the supply position for supplying the fluid sample and/or the solvent, respectively. The discharge position may also be located in the area of the supply position, but preferably at a sufficient distance therefrom so as not to disturb the process of supplying and of the discharging by fluidic interaction phenomena. It is also possible to provide the discharge position opposite to the supply position in a fluidic side path or in a fluidic parallel path. For example, the discharge position may be located at any desired position between a high-pressure outlet from one of plural channels of the fluid drive and an inlet of the sample separation device (especially a chromatographic separation column). In particular, it is possible to return the mobile phase to the corresponding mobile phase source container if it had been discharged from one of the channels of a multi-channel pump, for example a high-pressure mixing binary pump (i.e. before the mixing point).

It is also possible (for example, in the case of a fluid drive configured as a multi-channel gradient pump with high-pressure capability and mixing functionality) to place the discharge position in an area of the flowing mobile phase where it is a strong solvent or in an area of the flowing mobile phase where it is a weak solvent. In this way, the composition of the mobile phase may be additionally adjusted or modulated in a section that is related to the supplied sample or solvent volume.

The discharged flow can, for example, be actively discharged using an associated pump. Alternatively, it is also possible to generate the discharged flow passively (for example, by passively branching a flow, whereby the discharge flow rate is determined by the fluidic restriction of the discharge flow path).

With advantage, it is possible to provide a sample supply flow path, which has a dosing or metering pump (e.g. formed as a piston pump), a sample receiving volume, a movable needle and a seat for fluid-tightly receiving of the needle. Preferably, such a sample delivery flow path can be flushed separately. The use of a corresponding embodiment example provides a hydraulic injection function with the possibility to compress or to decompress the sample receiving volume, the needle and the seat as well as the metering pump before or after connection to the main flow path. Also, in an embodiment example, the metering pump can be flushed with fresh solvent to avoid carryover.

Both fluidic paths (e.g. needle, sample receiving volume, seat, metering pump on the one hand, analytical pump as fluid drive and chromatographic separation column as sample separation device on the other hand) can be operated independently of each other, except during the injection of the fluidic sample and/or of the solvent. It is therefore, with advantage, possible to select the solvents differently in the two fluidic paths as required. The removal of the mobile phase, which is preferably carried out when the fluidic sample and/or the solvent is injected, allows to reduce the disturbances of the fluidic system approximately to zero during the injection of the sample and/or of the solvent.

According to an implementation, an injection of a fluidic sample according to the "Feed Injection" principle can be carried out immediately or instantaneously (in particular without pressure increase). A continuous introduction of the fluidic sample is also possible, in that the sample flows into the main flow path to reduce the solvent strength of the sample and to be focused at the sample separation device (especially a column). A reduction of the concentration is possible, but this can be done with advantage not at the expense of the sample quantity. A mixing with the mobile phase can be effected to reduce the influences on the separation. An introduction of larger quantities of the fluidic sample and/or an introduction of the fluidic sample over a long time interval is also possible, wherein for reducing the solvent strength of the sample, the sample flows into the main flow path and is diluted with the mobile phase and is focused at the sample separation device (especially a column) according to the embodiment example.

According to an embodiment example, the speed of the "Feed Injection" can be adjusted depending on the requirements of a (in particular chromatographic) separation method.

According to an embodiment example, it is, with advantage, also possible to draw the fluid sample into a sample receiving volume in a direction, which is opposite to another direction, along which the sample is injected into the main flow path. In this way, undesirable dispersion effects can be reduced.

For realizing an injector according to an exemplary embodiment example, it may be sufficient to implement only a high-pressure fluid valve, which can preferably be embodied as a rotor valve having a rotor component and a stator component.

It is particularly preferred to pre-compress the fluidic sample and/or the solvent to be injected, for example using a metering pump, before the fluidic connection to the main flow path is established. Preferably, this is done with the same apparatus that had drawn up the sample (alternatively, however, it is also possible to provide additional apparatus for this purpose). In any case, according to an embodiment example, the sample can be compressed mandatorily before it is injected.

The discharging of the mobile phase and the injecting of the fluidic sample and/or of the solvent can, with advantage, be carried out by a single pump, which may have coupled pistons. An embodiment example with coupled pistons is, with advantage, operable approximately force-neutrally (or with no force) as soon as the two piston chambers are subjected to the same pressure conditions. It is also possible to provide a single piston in a single piston pump, which piston can be operated in push-pull mode using at least two separate pump chambers. Alternatively, a concerted operation of several different pumps is also possible.

The fluidic sample can be introduced into a sample receiving volume of the injector by implementing the injector with a needle-seat configuration. Alternatively, a sample container can be fluidically coupled directly to the injector.

Regardless of solvents used in the main analytical flow path, the fluidic sample can be introduced with only marginal influence of the solvent, which can be used for diluting the fluidic sample. Thus, it is in particular possible to introduce fluidic sample even if a strong sample solvent is present.

Exemplary embodiment examples have significant advantages: The described configuration of the injector allows to exclude a sample path (e.g. comprising needle, seat and sample receiving volume) from the main flow path having the fluid drive and the sample separation device. The injection speed is adjustable and can especially be implemented as method parameter.

A further advantage of exemplary embodiment examples can be seen in the fact that the sample can be focused as a function of the flow rate of a metering pump. In addition, an injected volume can be varied independently of a discharged volume. The sample path can be implemented to be pre-compressible. By pre-compressing the sample path, pressure fluctuations due to the injection process can be reduced to approximately zero. The injector architecture according to exemplary embodiment examples can be realized with or without needle architecture. It is also possible to carry out a number of sample injections with one single drawing-in of the fluidic sample (especially according to the "Feed Injection" principle). In addition, injections in short time intervals are possible (for example, to monitor a (for example chemical or biological) reaction). Such a reaction can take place, for example, in a sample receiving volume. A fluid that has been obtained as a result of such a reaction can be wholly or partially introduced into the main flow path between the fluid drive and the sample separation device. If, as described above, a flushing function is implemented, undesired sample carry-over can be suppressed particularly effectively. Furthermore, the injection volume can be adjusted freely and unlimitedly, depending on the size of a sample receiving volume.

FIG. 1 shows an HPLC system as an example of a sample separation apparatus 10 having a control device 70 coupled thereto according to an exemplary embodiment example of the invention.

FIG. 1 shows the principle structure of an HPLC system as an example of a measuring instrument embodied as a sample separation apparatus 10, as it can be used, for example, for liquid chromatography. A fluid pump as a fluid drive 20, which is supplied with solvents from a supply unit 25, drives a mobile phase through a sample separation device 30 (such as a chromatographic column) containing a stationary phase. A degasser 27 may degas the solvents before they are supplied to the fluid drive 20. A sample introduction unit, also known as an injector 40 and having a switchable fluid valve 90, is arranged between the fluid pump 20 and the separation device 30 in order to introduce a sample liquid into the fluidic separation path. The stationary phase of the sample separator 30 is suitably selected and conceived to separate components of the sample. A detector 50 having a flow cell detects separated components of the sample, and a fractioning device may be conceived to discharge separated components of the sample into dedicated containers. Liquids that are no longer required can be discharged into a drain container 60.

The control device 70 controls the individual components 20, 25, 27, 30, 40, 50, 60 of the sample separation apparatus 10.

As already mentioned, the injector 40 is used to inject a fluid sample into a mobile phase. A main flow path 100 of the injector 40 is located between the fluid drive 20 and the sample separation device 30 and, according to an exemplary embodiment example of the invention, never needs to be interrupted during operation. The fluid drive 20 serves to drive the mobile phase. The sample separation device 30 functions to separate the fluidic sample that has been injected into the mobile phase.

A discharge device 104 of the injector 40, schematically shown in FIG. 1, is configured to branch off a quantity (for example a defined volume) of the mobile phase from the main flow path 100. In the illustrated embodiment, the diverted mobile phase is supplied to a waste connection (or terminal) 131. A schematically represented supply device 102 of the injector 40 is configured to supply (or feed) an amount (or a quantity) (for example a defined volume) of the fluidic sample into the main flow path 100 simultaneously with the discharging of the predetermined amount of the mobile phase from the main flow path 100. The control device 70 synchronizes and/or controls the supply device 102 and the discharge device 104 as well as the fluid valve 90 preferably in such a way that the diverted volume of the mobile phase just corresponds to the supplied volume of the fluidic sample. Thus, an additional flow in the main flow path 100 by the discharged mobile phase as a result of the injection of the fluidic sample can just be compensated or equalized. If a flow rate of the discharged mobile phase corresponds to a flow rate of the supplied fluidic sample, the flow rate in the main flow path 100 outside the injector 40 remains unchanged when injecting the fluidic sample into the main flow path 100. In this way it is possible to strongly suppress or even completely avoid pressure jumps, oscillations in pressure and other artifacts resulting from the process of injecting the fluidic sample. A chromatographic separation result with high freedom from interference and accuracy can then be obtained. As an alternative to the described complete compensation of the supplied fluid volume by the discharged fluid volume, an only partial compensation of the supplied fluid volume by the discharged fluid volume can also be effected (which may be referred to as undercompensation or overcompensation, and which may also be used for an at least partial suppression of the described artifacts).

Figure 2:
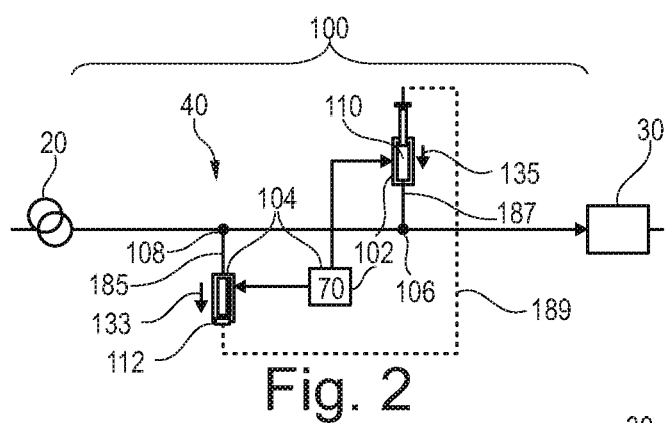
FIG. 2 shows an injector for a sample separation apparatus according to an exemplary embodiment of the invention.

FIG. 2 shows an injector 40 for a sample separation apparatus 10 according to an exemplary embodiment example of the invention. In this embodiment example, an immutability of the flow rate is given for a part of the main flow path 100 outside the section between the reference numerals 108 and 106.

The injector 40 according to FIG. 2 has a fluidic branch point 108 in the main flow path 100, which branch is formed here as a fluidic T-point. Mobile phase, which is conveyed from left to right by the fluidic drive 20 according to FIG. 2, is partly lead at the branch point 108 in the direction of the sample separating device 30 and partly discharged from the main flow path 100. At the fluidic branch point 108 the fluidic flow of the mobile phase is thus split into two separate partial flows.

In the injector 40 according to FIG. 2, there is also conceived a fluidic combination point 106 in the main flow path 100, which is also designed as a fluidic T-point. At the fluidic combination point 106, the supplied fluidic sample on the one hand and the mobile phase that has not been discharged from the main flow path 100 at the fluidic branch point 108 on the other hand are combined as fluidic partial flows into a common flow, which flows to the sample separating device 30.

FIG. 2 also shows that a first piston pump 110 is provided for supplying the fluidic sample to the main flow path 100, and a second piston pump 112 is provided for discharging the mobile phase from the main flow path 100. By the reference numeral 189, a mechanical coupling between the first piston pump 110 and the second piston pump 112 is represented in FIG. 2. The quantity and the speed of the supplying and the discharging of the respective fluid are adjusted by the speed of movement of the respective piston of the first piston pump 110 and/or of the second piston pump 112. For this purpose, the control device 70 controls both piston pumps 110, 112 to complete a synchronized operation. In other words, the first piston pump 110 and the second piston pump 112 are operatively coupled to each other due to the common control by the control device 70 in such a way that their piston movements are coordinated with each other. The actual directions of movement of the respective pistons (corresponding to an injection operation) of the first piston pump 110 and the second piston pump 112 are illustrated in FIG. 2 by arrows 133 and 135 respectively.

As shown in FIG. 2, in this embodiment example, the main flow path 100 between the fluid drive 20 and the sample separation device 30 is fluidically coupled in such a way that the flow between the fluid drive 20 and the sample separation device 30 is maintained without interruption during operation of the sample separation apparatus 10, namely also during the supplying of the fluidic sample from a supply flow path 187 (for example, partially containing the supply device 102) into the main flow path 100 and the discharging of part of the mobile phase from the main flow path 100 into a discharge flow path 185 (for example, partially containing the discharge device 104). A not only uninterrupted, but preferably also constant flow rate is achieved by the defined removal of a part of the mobile phase from the main flow path 100, the volume of which preferably just corresponds to the volume of the supplied fluidic sample.

Figure 3:
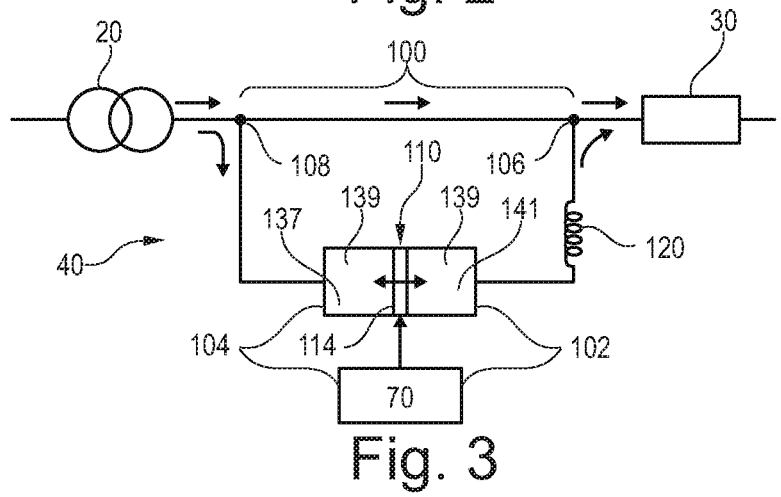
FIG. 3 shows an injector for a sample separation apparatus according to another exemplary embodiment example of the invention.

FIG. 3 shows an injector 40 for a sample separation apparatus 10 according to another exemplary embodiment example of the invention.

FIG. 3 shows a sample receiving volume 120, which may also be referred to as a "sample loop", and which may be used to receive (or collect) a predetermined amount of the fluidic sample. The embodiment example according to FIG. 3 differs from that according to FIG. 2 in particular also in that in the injector 40 according to FIG. 3 only one single piston pump 110 is provided, which causes both the supplying of the fluidic sample into the main flow path 100 and the discharging of mobile phase from the main flow path 100. The single piston pump 110 has a slidable piston 114, the position of which in a piston chamber 139 defines which partial volumes occupy a piston chamber section 137 on one side of the piston 114 and another piston chamber section 141 on another opposite side of the piston 114. Herein, the sum of the partial volumes of the piston chamber section 137 and the other piston chamber section 141 is always constant. Piston chamber section 137 is used to receive branched mobile phase and the other piston chamber section 141 is used to receive fluidic sample to be supplied. The piston 114 can be moved in a defined manner, as controlled by the control unit 70. If the piston 114 is moved from left to right according to FIG. 3, the piston 114 draws mobile phase from the fluidic branch point 108 into the piston chamber section 137 and simultaneously pushes fluidic sample from the other piston chamber section 141 or from the sample receiving volume 120 towards the fluidic combination point 106. Thus, according to FIG. 3, the common piston pump 110 is provided for supplying the fluidic sample and for discharging the mobile phase, and is arranged to simultaneously perform the supplying of the fluidic sample and the discharging of the mobile phase in a push-pull operation. The injector 40 as shown in FIG. 3 can therefore be designed to be particularly compact and can also be 5 easily operated in terms of control.

Optional check valves, not shown in FIG. 3 (see reference numeral 145 in FIG. 4A and FIG. 4B), in the fluid lines in the pump head, which connect the fluidic branch point 108 to the piston pump 110 and the piston pump 110 to the fluidic combination point 106, can be implemented in order to ensure a one-way fluid flow and prevent an unwanted flow in an opposite direction. Furthermore, it is possible to implement the piston chamber 139 in two parts so that part of the one common piston 114 is at least partially exposed between the two partial chambers (see reference numerals 137, 141).

Figure 4A:
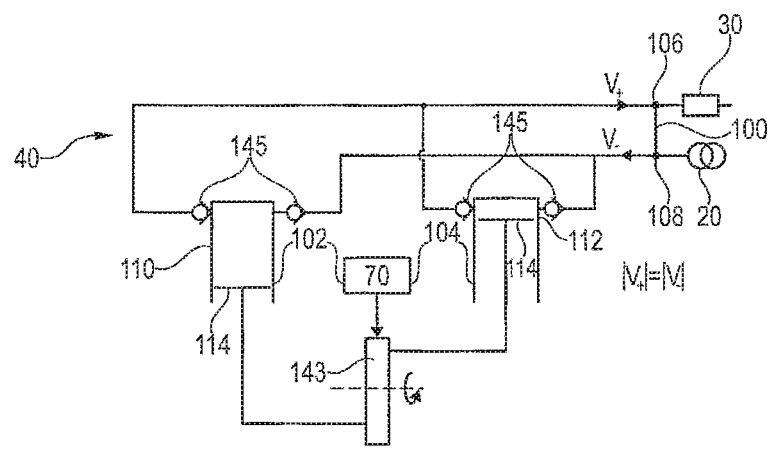
FIG. 4A shows an injector for a sample separation apparatus according to yet another exemplary embodiment example of the invention, corresponding to a supply of a fluidic sample from a sample receiving volume.
Figure 4B:
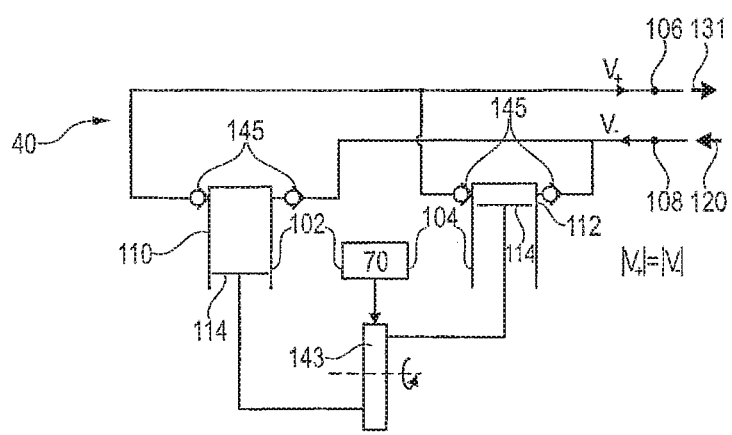
FIG. 4B shows the injector of FIG. 4A, corresponding to a drawing of fluidic sample into a sample receiving volume.

FIG. 4A and FIG. 4B show an injector 40 for a sample separating device 10 according to another exemplary embodiment example of the invention. Fluidic sample can be drawn from a container not shown (see reference numeral 118 in FIG. 7). FIG. 4A corresponds to a supplying of a fluidic sample from a sample receiving volume (see reference numeral 120 in FIG. 7). FIG. 4B corresponds to drawing of a fluidic sample into a sample receiving volume. FIG. 4B shows a waste connection 131. The two piston pumps 110, 112 shown are configured to operate continuously without interruption for an arbitrary number of piston cycles.

It is illustrated in FIG. 4A and FIG. 4B that the two pistons 114 of the two piston pumps 110, 112 are operatively coupled by a coupling element 143 (for example an eccentric disc) such that the movement of the pistons 114 has a fixed phase relationship to each other. FIG. 4A and FIG. 4B show various check valves (or non-return valves) 145, which determine a flow direction of the various fluids.

In FIG. 4A and FIG. 4B, the discharged flow is denoted by V−, whereas the supplied flow is denoted by V+. Preferably, the injector 40 according to FIG. 4A and FIG. 4B is operated in such a way that the following relationship applies: |V−|=|V+|, because then the supplied flow is exactly compensated by the discharged flow and the injection of the fluidic sample into the main flow path 100 can therefore be performed in a flow-neutral manner. The volumes of the piston chambers of the piston pumps 110, 112 as well as the strokes of the pistons 114 of the piston pumps 110 can be set identically in order to fulfill the above-mentioned relationship.

It should be noted that in the embodiment examples from FIG. 2 to FIG. 4B (in particular FIG. 3 and FIG. 4A and FIG. 4B) it is possible to perform a slow movement of the piston or pistons before the injecting of the sample in order to reduce the partial volume of the piston chamber section 141 and/or the volume in the cylinder of the piston pump 110 for the purpose of pre-compression of the sample. In this way, a partial volume (compression volume) of the mobile phase is discharged from the path of the piston pump 110 without compensation, however the disturbance remains very small because the discharge takes place only slowly (in contrast to a sudden activation and a sudden compression of the sample).

Figure 5:
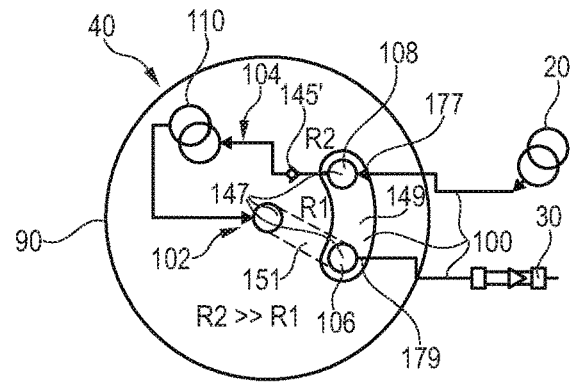
FIG. 5 shows an injector for a sample separation apparatus according to an exemplary embodiment of the invention.

FIG. 5 shows an injector 40 for a sample separation apparatus 10 according to an exemplary embodiment example of the invention. The operating condition according to FIG. 5 refers to the hydraulic connections during the introduction of a fluid sample into the main flow path 100.

According to FIG. 5, the injector 40 has a rotary fluid valve 90. The fluid valve 90 is composed of a stationary stator component and a rotor component to be rotated. The stator component has ports 147 as fluid connections (or terminals). In addition, the stator component also has a static fluid line 149, which is formed as a groove in the embodiment example shown. Of several fluid lines 151 of the rotor component that can be rotated and thus switched, only one is shown in FIG. 5, the others are shown for example in FIG. 7. The illustrated fluid valve 90 integrates in its interior, among others, a part of the main flow path 100 in the form of the static flow line 149, which is implemented as a groove.

In a fluidic path that contains the check valve 145' shown in FIG. 5, a fluidic restriction R2 is formed. A spring preload of the check valve 145' determines from which fluid pressure mobile phase can flow through the path having the fluidic restriction R2. In other words, the 145' check valve is to prevent a passive flow when the force is below an adjustable threshold. An alternative to implementing the check valve 145' as a spring-loaded check valve is, for example, the implementation of an active switch. The static fluid line 149 has a different fluidic restriction R1, where according to FIG. 5 the following relationship holds: R2>>R1. This means that a large portion of the mobile phase that is provided by the fluid drive 20 flows through the static fluid line 149 and from there further along the main flow path 100 to the sample separation device 30, whereas only a smaller portion of this mobile phase flows through the restriction R2 to the piston pump 110. In other words, at reference numeral 177, the mobile phase is divided between the two mentioned fluidic paths according to the values of the hydraulic resistances R1, R2. The portion of the mobile phase flowing through the fluidic restriction R2 is the discharged mobile phase that has been described with references to FIG. 1 to FIG. 4B for at least partially compensating the supplied fluidic sample, which may be supplied at reference numeral 179.

Figure 6:
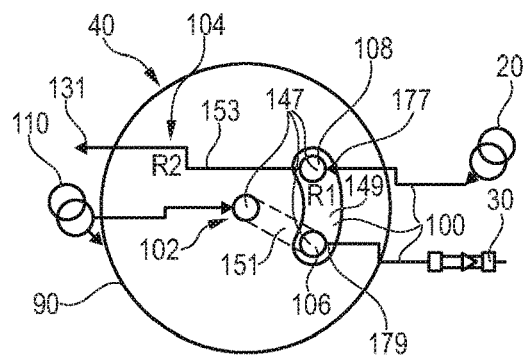
FIG. 6 shows an injector for a sample separation apparatus according to another exemplary embodiment of the invention.

FIG. 6 shows an injector 40 for a sample separation apparatus 10 according to another exemplary embodiment example of the invention.

In this embodiment example, the mobile phase to be discharged is not drained or let in by the piston pump 110, but is merely passively branched off into a fluidic path 153 with a defined fluidic restriction R2 and discharged via a waste connection 131.

Figure 7:
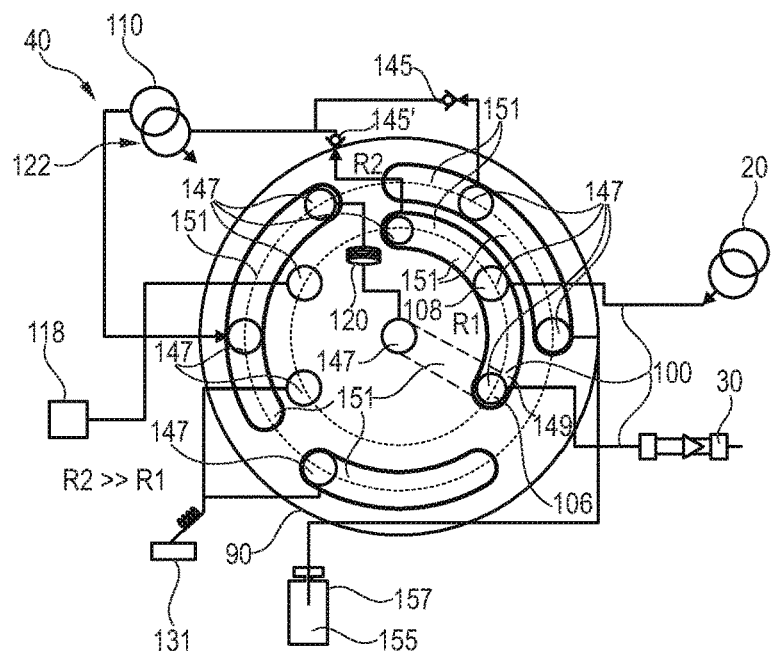
FIG. 7 shows an injector for a sample separating device according to an example of the execution of the invention.

FIG. 7 shows an injector 40 for a sample separation apparatus 10 according to an exemplary embodiment example of the invention.

The fluid valve 90 shown in FIG. 7 can be switched to the main flow path 100 for supplying the fluidic sample from a sample source 118. Furthermore, the injector 40 shown in FIG. 7 has a sample receiving volume 120 ("sample loop") that is fluidically coupled to the fluid valve 90 via two ports 147. For example, the sample receiving volume 120 may receive a fluid with a volume in the range of 10 ml to 500 ml. The fluid valve 90 can be switched in such a way that after the fluidic sample has been received from the sample source 118 into the sample receiving volume 120 by switching the fluid valve 90, the fluidic sample received in the sample receiving volume 120 is supplied into the main flow path 100. A conditioning liquid 155 (for example a diluent or a rinse solution) is provided in a corresponding liquid container 157 and is fluidically coupled to a port 147 of the fluid valve 90.

In addition, the injector 40 shown in FIG. 7 has, with advantage, a pre-compression device 122, which is configured to pre-compress the sample receiving volume 120 before switching to the main flow path 100. According to FIG. 7, the pre-compression device 122 is implemented by an appropriately controlled piston pump 110, which can be operated to pre-compress the sample receiving volume 120 and to supply the fluidic sample into the main flow path 100.

In order to lead fluidic sample into the main flow path 100, the fluid valve 90 can be switched such that the only fluid line 151, which is implemented as a radial groove, is rotated by 180° with respect to the valve position according to FIG. 7. Fluidic sample then flows from the sample source 118 through a port 147 and this radial groove via a central port 147 into the sample receiving volume 120. Thereafter, the fluid valve is switched to the valve position shown in FIG. 7. The fluidic sample that is now contained in the sample receiving volume 120 is now pumped, conveyed by the piston pump 110, to the port 147 at the center of the fluid valve 90, and passes through the radial groove and the combination point 106, implemented as port 147, into the main flow path 100, where the fluidic sample is conveyed by the fluid drive 20 together with mobile phase to the sample separation device 30.

Figure 8:
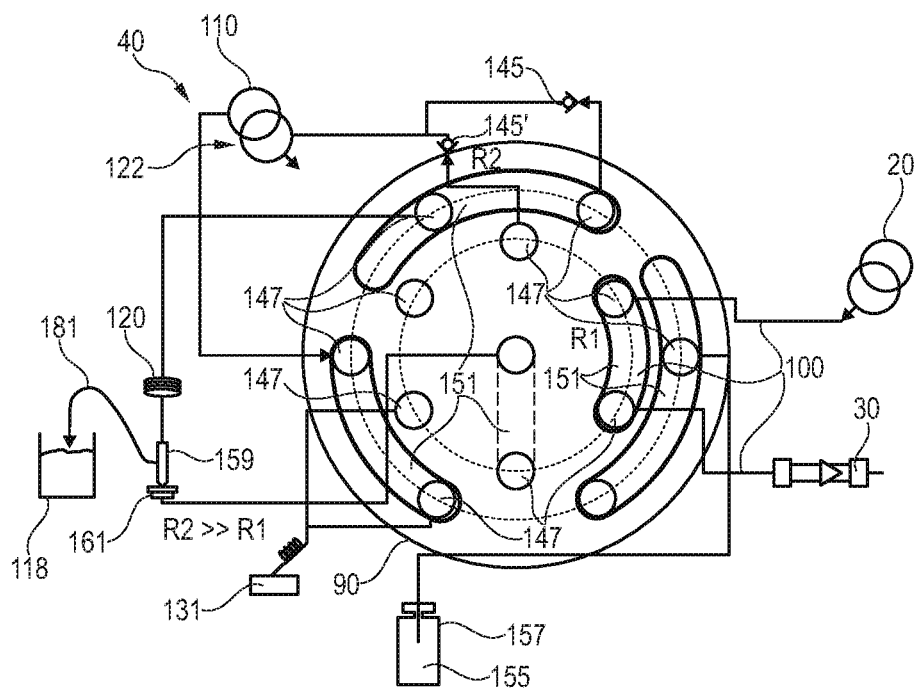
FIG. 8 shows an injector for a sample separation apparatus according to yet another exemplary embodiment example of the invention.

FIG. 8 shows an injector 40 for a sample separation apparatus 10 according to another exemplary embodiment example of the invention.

The embodiment example in FIG. 8 differs from the embodiment example in FIG. 7 in particular in that, according to FIG. 8, the fluidic sample is introduced from the sample container 118 into the sample receiving volume 120 by moving a movable (see reference numeral 181) needle 159 out of a seat 161 and immersing it into the sample container 118 for receiving the sample. By the piston pump 110, fluidic sample can then be sucked into the sample receiving volume 120. The needle 159 is then moved back into the seat 161.

Figure 9:
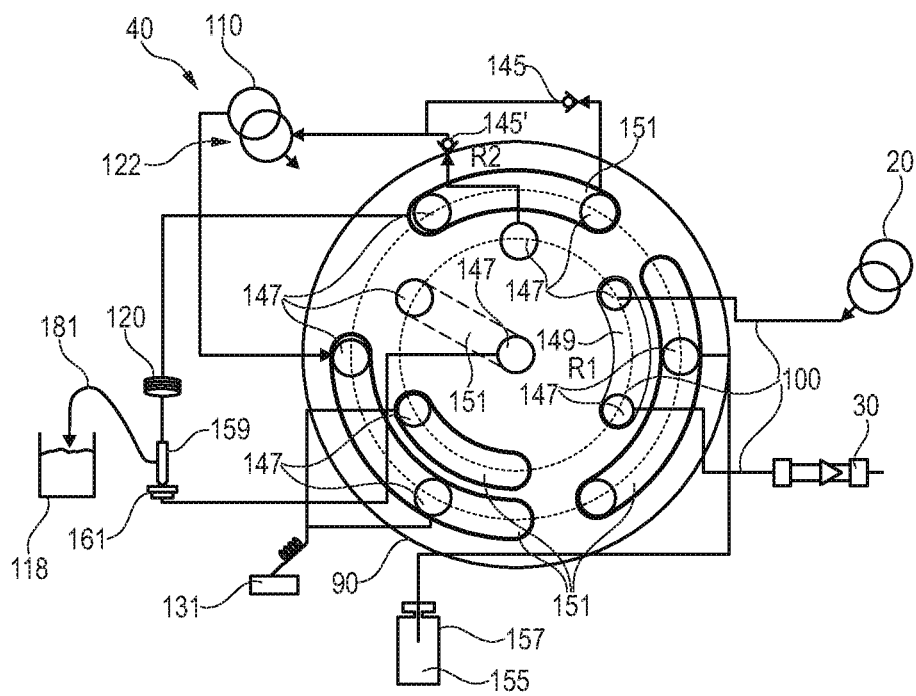
FIG. 9 shows an injector for a sample separation apparatus according to an exemplary embodiment example of the invention.

FIG. 9 shows an injector 40 for a sample separation apparatus 10 according to an exemplary embodiment example of the invention. The embodiment example in FIG. 9 is similar to that in FIG. 8, but uses a different fluid valve 90.

Figure 10:
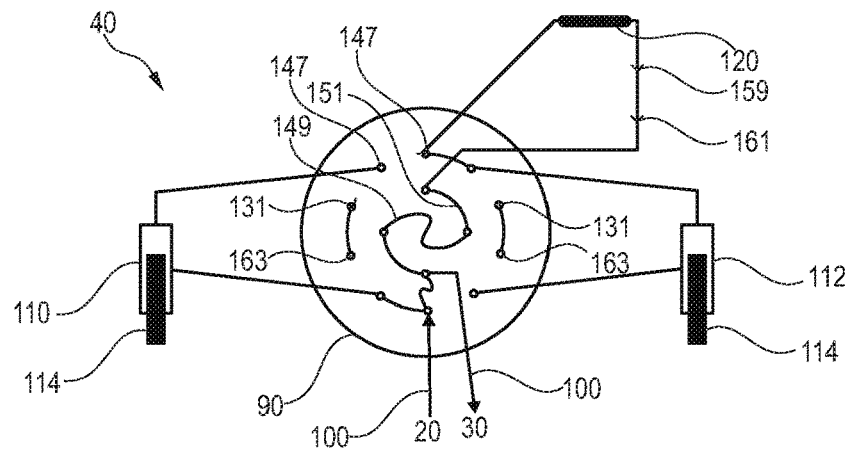
FIG. 10 shows an injector for a sample separation apparatus according to an exemplary embodiment example of the invention.
Figure 11:
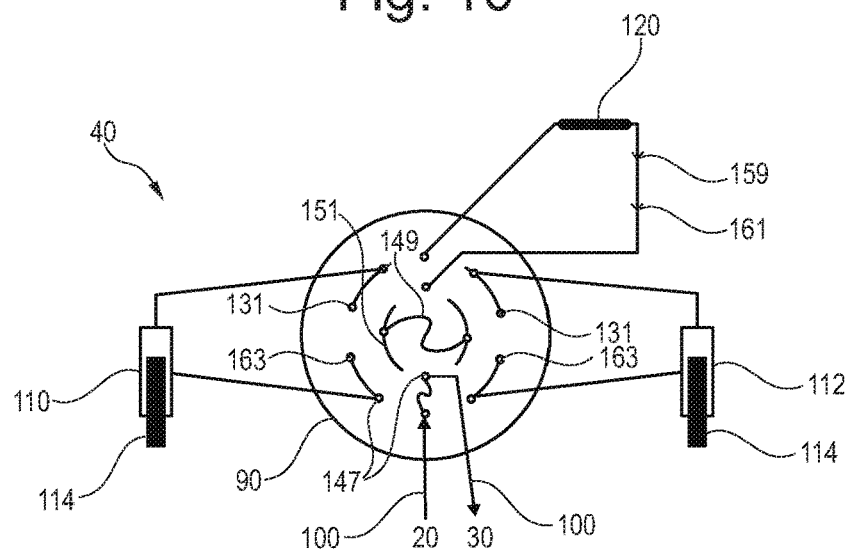
FIG. 11 shows the injector according to FIG. 10 in a different switching state of the fluid valve shown.
Figure 12:
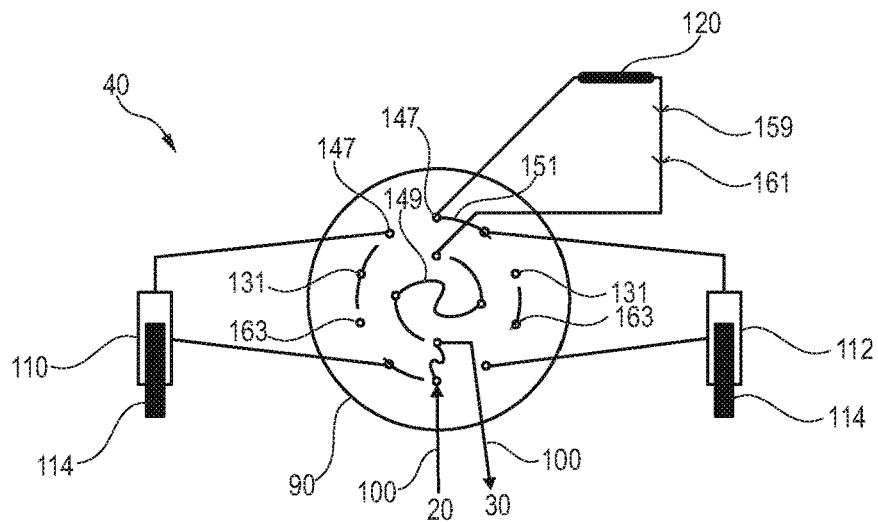
FIG. 12 shows the injector according to FIG. 10 in yet another switching state of the fluid valve shown.

FIG. 10, FIG. 11 and FIG. 12 show an injector 40 for a sample separation apparatus 10 according to an exemplary embodiment example of the invention in different switching states of the associated fluid valve 90. Reference numeral 163 refers to a flushing connection which is just as optional as waste connections 131. It is possible to use the injector 40 according to an exemplary embodiment example in a dual "push-pull" operation. In FIG. 10 to FIG. 12, an internal region of the fluid valve 90 is embodied as a switchable connection that is connected in the manner shown. Curved lines in FIG. 10 through FIG. 12 represent jumper connections. In FIG. 10, a drawing of a fluid and an injecting is shown. FIG. 11 refers to a flushing and an ejecting. FIG. 12 illustrates a compressing.

Figure 13:
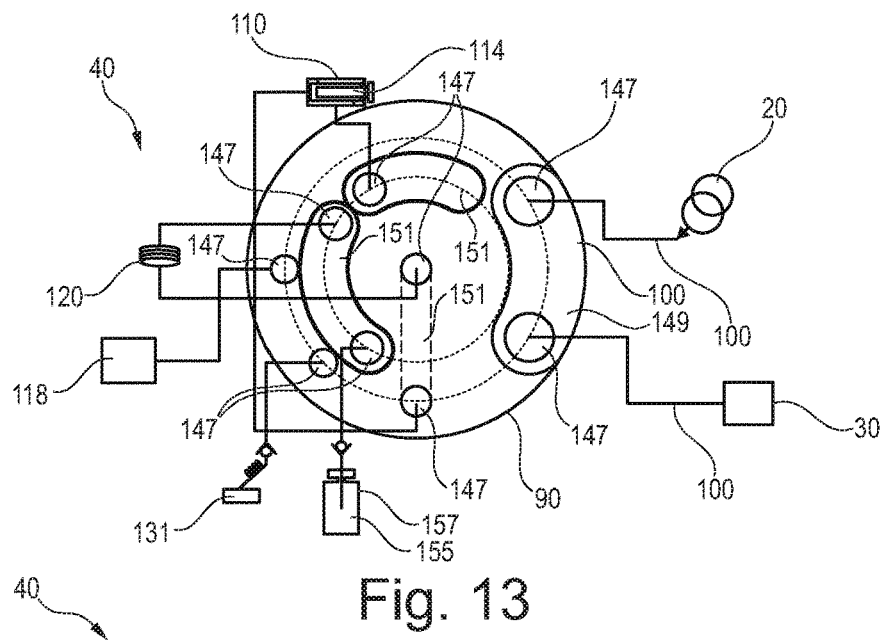
FIG. 13 shows an injector for a sample separation apparatus according to another exemplary embodiment example of the invention.
Figure 14:
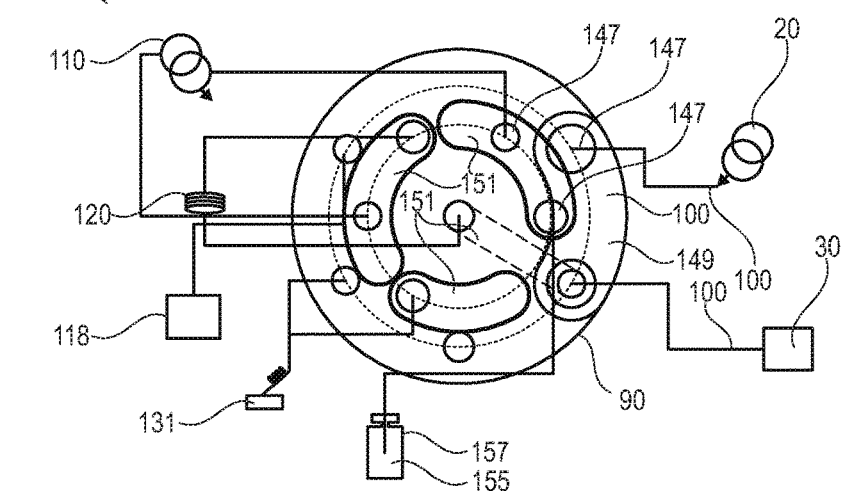
FIG. 14 shows an injector for a sample separation apparatus according to yet another exemplary embodiment example of the invention.
Figure 15:
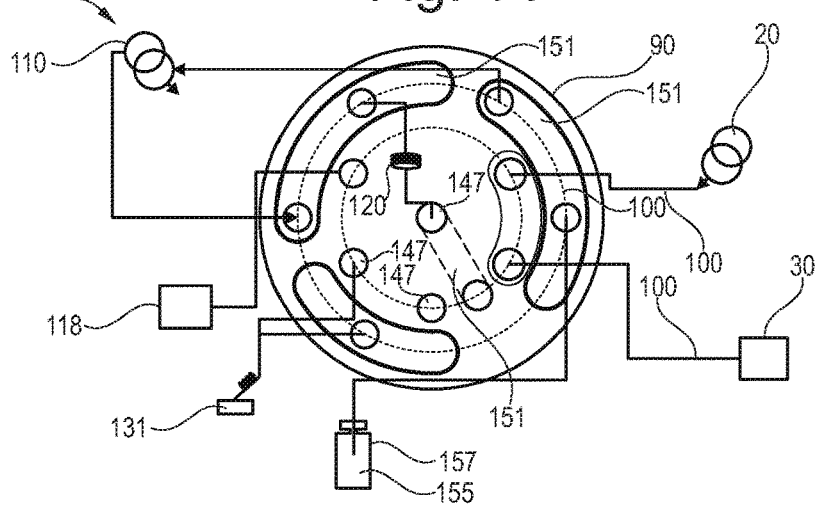
FIG. 15 shows an injector for a sample separation apparatus according to another exemplary embodiment example of the invention.

FIG. 13, FIG. 14 and FIG. 15 each show an injector 40 for a sample separation apparatus 10 according to an exemplary embodiment example of the invention. FIGS. 13 to 15 show that injectors 40 according to exemplary embodiment examples of the invention can be designed with very different valve configurations.

It should be noted that the term "comprising" does not exclude other elements and that the term "a" or "an" do not exclude a plurality. Also, elements that are described in connection with different embodiment examples can be combined. It should also be noted that reference numerals in the claims should not be interpreted as limiting the scope of protection of the claims.

The invention claimed is:

1. An injector for injecting a fluidic sample into a mobile phase in a sample separation apparatus, the injector comprising:
    a main flow path configured to be coupled between a fluid drive and a sample separation device, wherein the fluid drive is configured to drive the mobile phase, and the sample separation device is configured to separate the fluidic sample that is injected into the mobile phase;
    a discharge device comprising a pump configured to provide an actively controlled discharge of an amount of the mobile phase from the main flow path; and
    a supply device configured to supply an amount of the fluidic sample and/or a solvent into the main flow path, wherein the discharged amount and the supplied amount compensate each other at least partially.

2. The injector according to claim 1, comprising at least one of the following features:
    wherein the supply device and the discharge device are configured such that the supplied amount and the discharged amount differ from each other by less than 30%;
    wherein the supply device and the discharge device are configured such that the supplied amount and the discharged amount differ from each other by less than 10%;
    wherein the supply device and the discharge device are configured such that the supplied amount and the discharged amount are substantially equal;
    wherein a flow rate of the discharged mobile phase corresponds to a flow rate of the supplied fluidic sample and/or of the supplied solvent;
    wherein the supply device and the discharge device are arranged to perform the supplying of the fluidic sample and/or of the solvent and the discharging of the mobile phase such that the flow rate in the main flow path remains substantially unchanged;
    wherein the supply device and the discharge device are configured to perform the supplying of the fluidic sample and/or of the solvent and the discharging of the mobile phase such that a flow rate downstream of the supply device and a flow rate upstream of the discharge device substantially equal;
    wherein the supply device and the discharge device are configured to perform the supplying of the fluidic sample and/or of the solvent and the discharging of the mobile phase in a synchronized manner;
    wherein the supply device and the discharge device are configured to perform the suppling of the fluidic sample and/or of the solvent and the discharging of the mobile phase simultaneously;
    wherein the main flow path is configured to be fluidically coupled between the fluid drive and the sample separation device such that a flow between the fluid drive and the sample separation device is maintained uninterruptedly during operation of the sample separation device;
    wherein the main flow path is configured to be fluidically coupled between the fluid drive and the sample separation device such that a flow between the fluid drive and the sample separation device is maintained uninterruptedly upon feeding the fluidic sample and/or the solvent into the main flow path.

3. The injector according to claim 1, comprising a fluidic combination point in the main flow path, at which the supplied fluidic sample and/or the supplied solvent on the one hand and mobile phase driven by the fluid drive on the other hand are combined upon supplying as fluidic flows.

4. The injector according to claim 3, comprising a fluidic branch point in the main flow path, at which the mobile phase is at least partially discharged from the main flow path.

5. The injector according to claim 4, comprising at least one of the following features:
    wherein the fluidic branch point is located upstream of the fluidic combination point;
    wherein the fluidic branch point and the fluidic combination point are arranged relative to each other such that fluid does not pass by the branch point after passing the combination point.

6. The injector according to claim 1, comprising at least one pump configured to supply the fluidic sample and/or the solvent.

7. The injector according to claim 6, comprising at least one of the following features:

wherein the at least one pump is the pump configured to provide an actively controlled discharge of an amount of the mobile phase from the main flow path, and is configured to simultaneously effect the supplying of the fluidic sample and/or of the solvent and the discharging of the mobile phase;

comprising a first pump and a second pump, wherein the first pump is the at least one pump configured to supply the fluidic sample and/or the solvent, and the second pump is the pump configured to configured to provide an actively controlled discharge of an amount of the mobile phase from the main flow path;

comprising a first pump and a second pump, wherein the first pump is the at least one pump configured to supply the fluidic sample and/or the solvent, and the second pump is the pump configured to configured to provide an actively controlled discharge of an amount of the mobile phase from the main flow path, and wherein the first pump and the second pump are operatively coupled to each other;

comprising a first pump and a second pump, wherein the first pump is the at least one pump configured to supply the fluidic sample and/or the solvent, and the second pump is the pump configured to configured to provide an actively controlled discharge of an amount of the mobile phase from the main flow path, and wherein the first pump and the second pump are synchronized with each other;

comprising a first pump and a second pump, wherein the first pump is the at least one pump configured to supply the fluidic sample and/or the solvent, and the second pump is the pump configured to configured to provide an actively controlled discharge of an amount of the mobile phase from the main flow path, and wherein the first pump and the second pump are operable with a fixed phase relationship to each other;

wherein the at least one pump is configured to be operable without interruption over an arbitrary number of cycles.

8. The injector according to claim 1, comprising at least one of the following features:

the injector is configured to perform a predetermined mixing or dilution of the fluidic sample and/or of the solvent with the mobile phase;

the injector is configured to perform a dilution of the fluidic sample and/or of the solvent with the mobile phase at a set feed rate;

wherein the discharge device is formed in addition to and/or separately from and/or not in the main flow path;

wherein the supply device is formed in addition to and/or separately from and/or not in the main flow path;

wherein the main flow path contains neither the discharge device nor the supply device;

comprising a fluidic discharge flow path which branches off and leads away from the main flow path at a fluidic branch point;

comprising a fluidic supply flow path which, at a fluidic combination point, leads into the main flow path.

9. A sample separation apparatus for separating a fluidic sample, the sample separation apparatus comprising:

the injector according to claim 1;

the fluid drive of claim 1, wherein the fluid drive is coupled to the main flow path; and the sample separation device of claim 1, wherein the sample separation device is coupled to the main flow path.

10. The sample separation apparatus according to claim 9, further comprising at least one of the following features:

the sample separation device is configured as one of a preparative sample separation device or an analytical sample separation device;

the sample separation device is configured as a chromatographic separation device;

the sample separation apparatus is configured to analyze at least one physical, chemical and/or biological parameter of at least one fraction of the fluidic sample;

the sample separation apparatus comprises a device for chemical, biological and/or pharmaceutical analysis;

the sample separation apparatus comprises one of: a chromatography device; a liquid chromatography device; a gas chromatography device; a supercritical fluid chromatography device; an HPLC device; and a UHPLC device;

the fluid drive is configured to drive the mobile phase with a high pressure;

the fluid drive is configured to drive the mobile phase with a pressure of at least 100 bar;

the fluid drive is configured to drive the mobile phase with a pressure of at least at least 500 bar;

the fluid drive is configured to drive the mobile phase with a pressure of at least at least 1000 bar;

the sample separation apparatus is configured as a microfluidic device;

the sample separation apparatus is configured as a nanofluidic device;

the sample separation apparatus comprises a detector for detecting the separated fluidic sample;

the sample separation device comprises a sample fractionator for fractionating the separated fluidic sample.

11. A method for injecting a fluidic sample into a mobile phase in a sample separation apparatus, the method comprising:

driving a mobile phase in a main flow path of a sample separation apparatus between a fluid drive and a sample separation device;

providing an actively controlled discharge of an amount of the mobile phase from the main flow path, by providing a discharge device comprising a pump; and supplying an amount of a fluidic sample and/or of a solvent to the main flow path, wherein the discharged amount and the supplied amount are dimensioned such that they compensate each other at least partially.

* * * * *